May 4, 1965
J. J. O'DONNELL
3,181,907
ROPE SLINGS
Filed Aug. 9, 1962
2 Sheets-Sheet 1
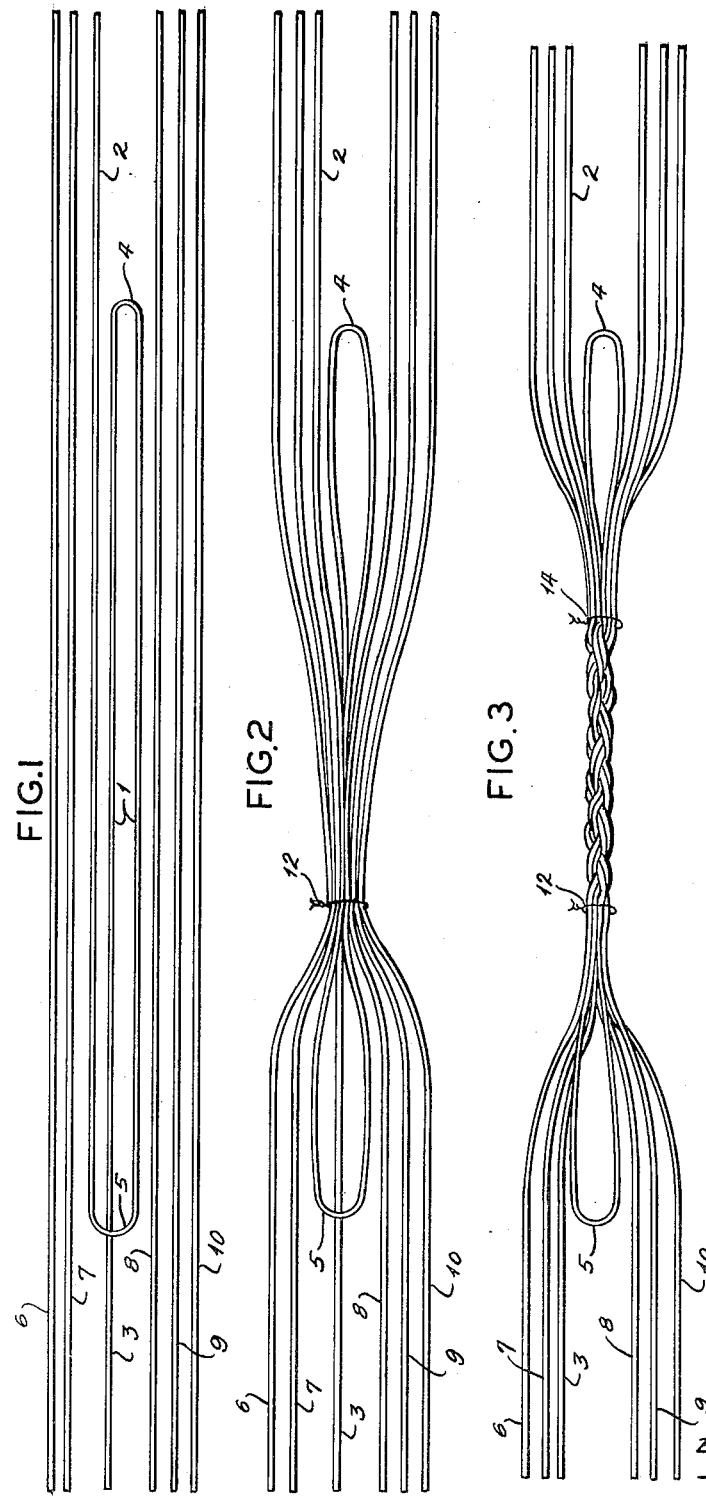
INVENTOR:
JOHN J. O'DONNELL
BY
Sutherland Polster & Taylor
ATTORNEYS.

May 4, 1965  J. J. O'DONNELL  3,181,907
ROPE SLINGS
Filed Aug. 9, 1962  2 Sheets-Sheet 2
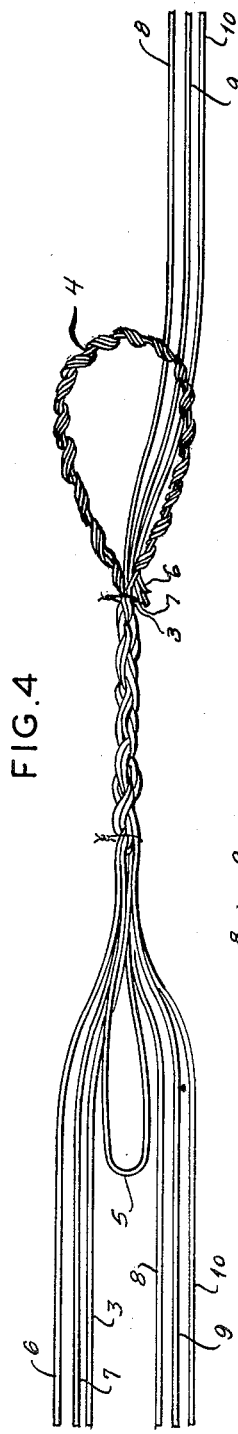
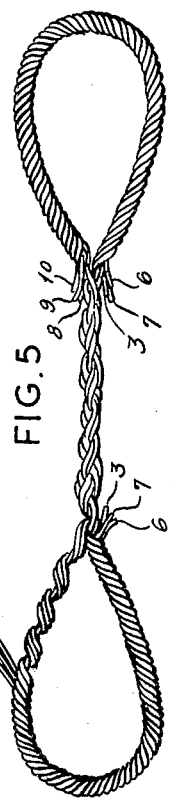
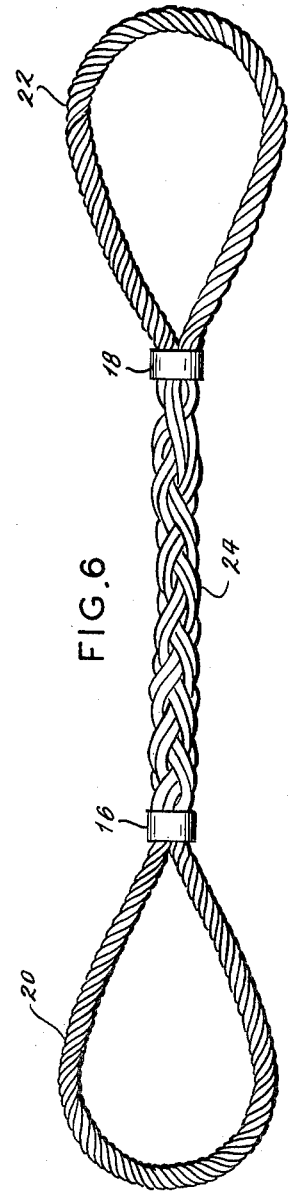
INVENTOR:
JOHN J. O'DONNELL
BY
Sutherland, Polster & Taylor
ATTORNEYS

United States Patent Office 3,181,907
Patented May 4, 1965

3,181,907
ROPE SLINGS
John J. O'Donnell, 1139 Oran, St. Louis, Mo.; Mabel O'Donnell, surviving spouse of said John J. O'Donnell, deceased
Filed Aug. 9, 1962, Ser. No. 215,875
2 Claims. (Cl. 294—74)

This invention relates to rope slings which includes slings made up of a plurality of strands, of a plurality of ropes each of which has a plurality of strands, or of a plurality of cables each made up of a plurality of ropes. More specifically, this invention relates to the construction of an eye on the end of a rope sling and the manner in which that eye is formed. It being understood that the eye on the end of the sling is that part of the sling which forms a closed loop and is slipped over the hoist hook of a crane with which the sling is used. Usually a sling is constructed with an eye at each end. The sling is wrapped around the load and both eyes are slipped over the hoist hook, but this is not necessarily so. For example, the sling may be used to form a "choker" hitch in which case one eye is slipped over the other to form a loop and the eye on the free end of the loop slipped onto the hoist hook of the crane. In this example, one eye on the hook takes the strain of all of the load. Also, the eyes must be made flexible so that one will pass over the other.

Slings are used in many ways and are made in several forms, but this description will be restricted to one form of sling, it being understood that the invention can have other applications. The above example of the "choker" hitch use will serve to illustrate the importance of having an eye structure at least as strong as, and preferably stronger than, the other portions of the sling.

Some prior art slings have been constructed by a single elementary strand of rope of suitable length with opposite ends spliced together to form an endless strand. This endless strand is then formed into loops of equal size laying side by side. Thereafter, the pairs of ropes forming each loop are braided together to leave an eye of individual ropes laying side by side at each end. The number of ropes in each eye is therefore half the number braided together between the eyes. Of course, the eye would then be the weakest part of such a sling, because the ropes in the eye are subject to both a load in shear as well as tension.

Other prior slings were made by braiding together separate lengths of rope leaving opposite ends of the ropes free. Thereafter, the free ends were separated into two groups of strands at each end of equal number. One of these groups were twisted together in one direction and formed into a loop by splicing the ends into the braided portion. The other group at that end was then twisted around the first group in the opposite direction onto the loop formed by the first group and the free ends of that group spliced into the braided portion. When both ends of the sling were formed in this manner, the entire sling was formed of braided ropes. While the sling formed in this manner had eyes with the same number of ropes as the body, the strength characteristics of the eyes in percent was found to be relatively low with respect to the portion of the sling between the eyes. Consequently, when tested to failure, the fracture usually occurred in one of the eyes. It has always been a problem in sling making to construct eyes which are as strong as the remainder of the sling. Some have even resorted to the use of steel thimbles in the eyes in order to better distribute the strain between the ropes forming the eye. This invention departs from all prior teachings in the art as to the construction of the eye of a sling.

It is an object of this invention to provide a rope sling with eyes formed of ropes cable-laid about a rope core.

It is another object of this invention to provide a braided rope sling with eyes formed of ropes cable-laid about a rope core which extends through each eye.

It is still another object of this invention to form a braided rope sling with eyes of cable-laid ropes about a rope core in such a manner that fittings, or shackles, can be secured to the eyes as the sling is made up.

It is still another object of this invention to provide a rope sling with eyes in which the core for an eye is a single rope about which other ropes are cable-laid.

It is still another-object of this invention to provide a rope sling with eyes at each end in which the core for each eye is a single rope about which other ropes are cable-laid in each eye.

It is still another object of this invention to provide a rope sling with a body formed of a plurality of ropes and eyes on the body formed of cable-laid ropes in which the number of ropes in each eye differs by one rope from the number in other portions of the sling.

Other objects and advantages of this invention will appear from the following detailed description which is in such clear, concise and exact terms as will enable any person skilled in the art to make and use the same when taken in conjunction with the accompanying drawings, forming a part thereof, and in which:

FIG. 1 is a schematic illustration of the manner of laying out several pieces of rope in order to form a sling according to this invention;

FIG. 2 is a view similar to FIG. 1 showing the separate strands of rope secured by a temporary tie adjacent one end;

FIG. 3 is a schematic illustration similar to the preceding views showing a portion of the sling braided and the temporary ties adjacent opposite loops;

FIG. 4 is a schematic view similar to the preceding views illustrating the manner in which the ropes are laid into a cable adjacent one end;

FIG. 5 is a schematic view similar to the preceding views illustrating the manner in which the other free ropes are cable-laid in the opposite direction of twist to complete the cable-laid eye; and FIG. 6 is a view of a completed sling.

Turning now to FIG. 1 of the drawings, a plurality of separate strands of rope are first laid out in the manner shown in FIG. 1. As shown in this illustration, a single strand of rope is formed into a loop 1 so as to provide two free ends such as 2 and 3 at opposite ends of the loop 1. The loop has a bend 4 at one end and a bend 5 at the opposite end. Along side this looped strand of rope, just described, are laid five straight strands of rope indicated separately as 6, 7, 8, 9 and 10.

As shown in FIG. 2, a temporary tie 12 is placed around all of the strands of rope to gather them into a bundle. This temporary tie 12 is placed adjacent the bend 5 in a position which determines the size of the loop of the bend 5 which will subsequently become the core rope of one of the eyes at one end of the sling.

FIG. 3 illustrates how the several strands of rope and the loop 1 are braided together to form the body of the sling between the eyes. After the braiding is completed, in FIG. 3, a temporary tie 14 is placed adjacent the other end of the sling spaced from the tie 12 so as to determine the length of the body of the sling and the size of the loop made by the bend 4 which in turn will become the rope core for the opposite eye of the sling.

Turning now to FIG. 4, it will be observed that the three strands of rope, 3, 6 and 7, are now grouped side by side and layed in a cable fashion around the rope core in the bend 4 by twisting these rope strands together in one direction. After this twisting operation is complete around the rope core formed by the bend 4, these strands may be temporarily fastened by a tie, such as heretofore described.

The eye on the opposite end of the sling is formed in exactly the same manner by grouping the rope strands 3, 6 and 7 together in side by side relation and laying them about the bend 5 as a core by twisting them in one direction. After the ends 3, 6 and 7 are secured temporarily in each eye, then the ends of the rope strands 8, 9 and 10 may be grouped side by side and laid about the cores formed by the bends 4 and 5 by twisting them in the opposite direction to the direction of wind of rope strands 3, 6 and 7. When this operation is completed, a pair of metal ferrules 16 and 18 are placed at the throat of each eye and pressed together to clamp the free ends of the several rope strands 3, 6, 7, 8, 9 and 10. This completes the sling which is shown in final form in FIG. 6. Eyes 20 and 22 are of the same construction. Both are formed on rope cores 4 and 5 by ropes 3, 6 and 7 cable-laid about each rope core in one direction of twist and ropes 8, 9 and 10 cable-laid about each rope core with a direction of twist of the opposite hand. Each eye is formed cable-laid by an equal number of ropes twisted oppositely to equalize the strain. When load is applied, there is no tendency to twist the sling and form kinks which eventually lead to failure.

The final sling in the particular example described is provided with eyes 20 and 22 composed of seven ropes cable-laid, which eyes form a continuation of the eight ropes forming the braided body 24. This relation will apply regardless of the number of ropes. Each eye, therefore, has one less rope than the body, but since each eye is a rope doubled upon itself, the load in tension is equally divided in each side of the eye so that this load is in turn imposed equally on each rope on each side of the eye, or, divided equally fourteen ways. This strength characteristic is inherent in cable-laid construction especially when formed with half the ropes twisted one way and half the other. It is not characteristic of a construction wherein ropes are braided or act independently.

The rope forming the core can be a different size than the other ropes used if desired, and it is not necessary, of course, that both cores be formed in a single rope for it is possible to splice the ends of each core into the braided body.

If it is desired to provide the eyes with fittings of one kind or another, it is possible to put the fittings in the bends 4 and 5 of FIG. 1 before the forming operations are commenced. The build-up of the rope sling is then followed in exactly the same manner so as to integrally connect the fittings with the eyes. The metal ferrules which are pressed on as the final step replace all of the temporary ties, or sizings, which may be used to hold the rope strands in position during the intermediate steps of the process.

Changes in and modifications of the construction described may be made without departing from the spirit of my invention or sacrificing its advantages.

Having thus described the invention, what is claimed and desired to be secured by Letters Patent is:

1. In a sling having a body portion composed of a plurality of side by side ropes twisted together for a portion of their length between their opposite ends to form a body portion for said sling with ropes projecting at each end of said body portion, and eyes for said sling formed by twisting said projecting ropes, the improvement comprising,
    (a) a core for each eye formed by rope doubled upon itself and extending through the body portion of said sling to provide a projecting bend at each end of the body portion for the rope core for each eye and free ends projecting beside each bend, and
    (b) said projecting ropes and free ends being divided into groups at each end of said body portion and wrapped about one of said bends in a consecutive manner and in opposite directions to form eyes of cable-laid ropes.

2. In a sling having a body portion composed of a plurality of side by side ropes twisted together for a portion of their length between their opposite ends to form a body portion for said sling with ropes projecting at each end of said body portion, and eyes for said sling formed by twisting said projecting ropes about a rope core, the improvement comprising,
    (a) said rope core in each eye being formed by a rope twice doubled upon itself and extending through the body portion of said sling to provide a bend projecting at each end of the body portion for the rope core in each eye and a free end projecting beside each bend, and
    (b) said projecting ends being divided into groups at each end of said body portion and wrapped about one of said projecting bends in a consecutive manner and in opposite directions to form an eye of cable-laid ropes.

References Cited by the Examiner
UNITED STATES PATENTS

| | | | |
|---|---|---|---|
| 2,414,664 | 1/47 | Peterson | 57—142 |
| 2,889,603 | 6/59 | Joy | 294—74 X |

SAMUEL F. COLEMAN, *Primary Examiner.*

ANDRES H. NIELSEN, *Examiner.*